(12) United States Patent
Nagl et al.

(10) Patent No.: US 6,359,131 B1
(45) Date of Patent: Mar. 19, 2002

(54) PROCESS FOR PREPARING DIOXAZINE COMPOUNDS

(75) Inventors: Gert Nagl, Niederdorfelden; Wolfgang Bauer, Maintal; Peter Kempter, Bad Soden, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/535,502

(22) Filed: Mar. 24, 2000

(30) Foreign Application Priority Data

Mar. 25, 1999 (DE) .......................... 199 13 401

(51) Int. Cl.⁷ .......................................... C07D 265/34
(52) U.S. Cl. ........................................... 544/99
(58) Field of Search ............................ 544/99

(56) References Cited

U.S. PATENT DOCUMENTS

| | | | |
|---|---|---|---|
| 3,956,266 A | 5/1976 | Mory et al. | 260/157 |
| 3,979,386 A | 9/1976 | Von der Crone et al. | 260/256.4 Q |
| 4,153,798 A | 5/1979 | Heise et al. | 548/305 |
| 4,345,074 A | 8/1982 | Hufnagel et al. | 544/99 |
| 4,515,940 A | 5/1985 | Berthold | 534/565 |
| 4,526,963 A | 7/1985 | Deur | 544/74 |
| 4,738,721 A | 4/1988 | Baxter et al. | 106/22 |
| 4,869,989 A | 9/1989 | Raue et al. | 430/106 |
| 5,539,088 A | 7/1996 | Schumacher et al. | 534/633 |
| 5,565,563 A | 10/1996 | Kaul et al. | 544/74 |
| 5,698,705 A | 12/1997 | Alfter et al. | 548/305.4 |
| 5,786,523 A | 7/1998 | Ueno et al. | 568/735 |
| 5,932,727 A | 8/1999 | Nagl et al. | 544/99 |
| 6,214,989 B1 | 4/2001 | Kaul et al. | 544/74 |

FOREIGN PATENT DOCUMENTS

| | | |
|---|---|---|
| AU | 9650735 | 10/1996 |
| CH | 688237 | 6/1997 |
| DE | 2425594 | 12/1974 |
| DE | 2451097 | 5/1975 |
| DE | 2612391 | 10/1977 |
| DE | 30 10 949 | 10/1980 |
| DE | 2925541 | 1/1981 |
| DE | 3917602 | 12/1990 |
| DE | 4442291 | 6/1995 |
| DE | 19727079 | * 1/1999 |
| DE | 19643344 | * 4/1999 |
| EP | 0095255 | 11/1983 |
| EP | 0675172 | 10/1995 |
| EP | 0686673 | 12/1995 |
| EP | 0 738726 | 10/1996 |
| EP | 911337 | * 4/1999 |
| GB | 2284427 | 6/1995 |
| JP | A 56 135 556 | 10/1981 |
| WO | WO/9632366 | 10/1996 |

OTHER PUBLICATIONS

Chem. Abstract 95–23–8 and 73778–92–4.
Chem. Abstract 69: 86056, 1968.
Derwent Abstract, Ref. 83–726920/31 zu RD–231–009–A.
Chemical Abstract—vol. 72, 1970, 31697Y.
Chemical Abstract—vol. 92, 1980, 215441E.
Chemical Abstract—vol. 96, 1982, 218731T.
Chemical Abstract,—NR. 6973–93–9, 123855–79–86–4.
W. Gerhartz, Ullmann's Encyclopedia of Industrial Chemistry, 5$^{th}$, A3.
Patent Abstract for JP A–7 331 098.
Patent Abstract for JP A 7 331 097.

* cited by examiner

Primary Examiner—Richard L. Raymond
Assistant Examiner—Sudhaker B. Patel
(74) Attorney, Agent, or Firm—Susan S. Jackson; Scott E. Hanf

(57) ABSTRACT

The process provides a process for preparing dioxazines by ring closure of a compound of the formula (II)

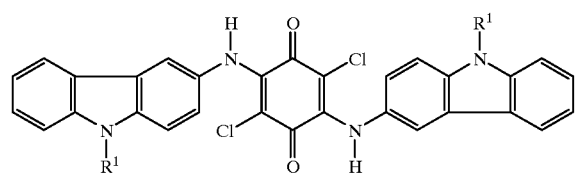

(II)

in which $R^1$ is hydrogen or $C_1$–$C_8$ alkyl in the presence of a ring closure agent, which comprises using as reaction medium an aryl alkyl ether of the formula (III) or a mixture of aryl alkyl ethers of the formula (III)

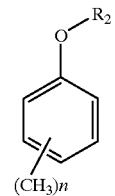

(III)

in which n is an integer from 0 to 2 and $R_2$ is ethyl if n is 0 or is methyl if n is 1 or 2.

17 Claims, No Drawings

PROCESS FOR PREPARING DIOXAZINE COMPOUNDS

BACKGROUND OF THE INVENTION

The present invention is situated within the field of organic colorants and relates to an improved process for preparing dioxazine compounds. Dioxazine compounds are used to prepare valuable dyes and pigments (see Ullmann's Encyclopedia of Industrial Chemistry, Vol. A 3, p. 233). They are prepared industrially in a five-stage synthesis embracing the N-alkylation of carbazole, nitration, reduction, condensation and ring closure. In the final stage of the synthesis, compounds of the formula (II)

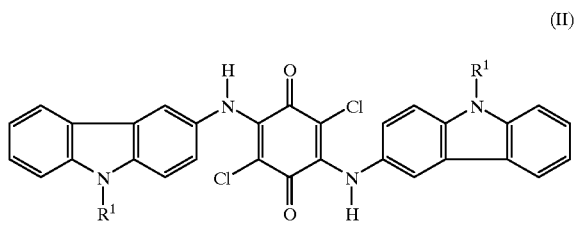

(II)

are cyclized to the dioxazine compounds using ring closure agents, such as benzenesulfonyl chloride or 4-toluenesulfonyl chloride, for example (DE-A 30 10 949). High temperatures are needed for the ring closure. Consequently, the only suitable reaction media for the ring closure are inert solvents whose boiling point under atmospheric pressure is more than 160° C. Proposed solvents of this type have included halogenated aromatic solvents, especially o-dichlorobenzene; nitrobenzene; polar aprotic solvents, such as quinoline; and halogenated monoalkyl-, dialkyl- and trialkylbenzenes, alkylnaphthalenes, and also alkanes and alkenes. Of these reaction media, the only one which has become established to date for the industrial preparation of dioxazine compounds is o-dichlorobenzene, since this solvent offers a number of advantages in both technical and economic respects. Significant advantages of o-dichlorobenzene are the high yields at all stages that can be achieved in this reaction medium, and also the easy phase separations and the resulting possibility of working without isolating the intermediates and without changing solvent. A procedure of this kind makes it possible to prepare the dioxazine compounds in a technically simple and economically advantageous way. Like other chlorinated aromatic solvents, however, o-dichlorobenzene has the disadvantage that the production wastewaters contain AOX and that, at the high reaction temperatures, toxic and environmentally harmful substances are formed in trace amounts, accumulate in the regenerated solvent in the production circuit and can also be detected in the product.

As environmental concerns acquired increasing importance therefore, a need came about for a preparation process which is advantageous to conduct over all stages of the synthesis—that is, which does not necessitate any isolation of intermediates or change of solvent—but which, unlike that using o-dichlorobenzene, is environmentally unobjectionable.

The halogen-free reaction media proposed to date have disadvantages which hinder their use in an industrial process for preparing dioxazine compounds. Polar aprotic solvents such as quinoline and dimethylformamide (JP-A-56-135 556) differ from o-dichlorobenzene in being soluble in water and are unsuitable as reaction media for all reaction stages of the synthesis. In these solvents, furthermore, the synthesis cannot be carried out without isolation of intermediates. When these solvents are used, it is necessary to isolate the condensation product prior to the ring closure and to change the reaction medium to allow substantially anhydrous operation and to give acceptable yields. Consequently, preparing dioxazine compounds using these solvents is technically complex and uneconomical.

Monoalkyl-, dialkyl- and trialkylbenzenes and alkylnaphthalenes (JP-A-7-331 097) and also alkanes and alkenes (JP-A-7-331 098) likewise have disadvantages in respect of the technical and economic preparation of the dioxazine compounds. In the preliminary stages, for example, the poorer solubilities of the intermediates, byproducts and the chloranil in these solvents in comparison with o-dichlorobenzene makes it necessary to employ substantially larger reaction volumes. Furthermore, the phases have to be separated in relatively large vessels. This makes the space yields significantly poorer than when working in o-dichlorobenzene. Furthermore, the use of these solvents gives rise to phase separation problems, resulting in long preparation times and thus poor time yields. If the synthesis is carried out without isolation of intermediates, the poor solubility of the excess chloranil and of the byproducts accumulated at the end of the synthesis in these solvents is a further serious disadvantage. Furthermore, following the isolation of the dioxazine compounds by filtration, they have to be washed with an organic solvent having better solvency in order to free the product completely from the byproducts and the unreacted starting products, which otherwise impair the performance properties. The product crystals are usually substantially smaller and of inferior morphology than when o-dichlorobenzene is used as the reaction medium; for this reason, in the course of the necessary washing with the additional polar solvent, there may be a drastic deterioration in the filtration form. Operating with a second organic solvent, moreover, represents an additional technical expense. The ring closure yields achievable in these halogen-free solvents are only moderate. Because of these disadvantages, the above-proposed halogen-free solvents have also been unable to replace the o-dichlorobenzene which has been preferred to date for the industrial preparation of the dioxazine compounds.

SUMMARY OF THE INVENTION

It has now surprisingly been found that certain aryl alkyl ethers which boil above 160° C. are especially suitable as a reaction medium for the complete synthesis of the dioxazine compounds.

DESCRIPTION OF THE PREFERRED EMBODIMENTS

The present invention accordingly provides a process for preparing dioxazines by ring closure of a compound of the formula (II)

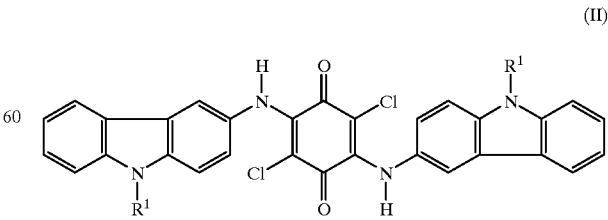

(II)

in which $R^1$ is hydrogen or $C_1$–$C_8$ alkyl in the presence of a ring closure agent, which comprises using as reaction medium an aryl alkyl ether of the formula (III) or a mixture of aryl alkyl ethers of the formula (III)

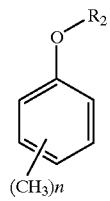

(III)

in which n is an integer from 0 to 2 and $R_2$ is ethyl if n is 0 or is methyl if n is 1 or 2.

Preference is given to n =0 and $R_2$=ethyl (phenetole), and to n=1 and $R_2$=methyl. The methyl group is preferably positioned m or p with respect to the ether function. Particular preference is given to p-cresyl methyl ether (4-methylanisole).

$C_1$–$C_8$-alkyl $R^1$ can be straight-chain or branched and can for example be methyl, ethyl, n-propyl, isopropyl, n-butyl, sec-butyl, isobutyl, tert.-butyl, pentyl, hexyl, heptyl or octyl. Preference is given to methyl, ethyl or propyl, especially ethyl.

The dioxazine compounds formed in the process of the invention can in principle possess a structure of the formula (a), (b) or (c) or can be a mixture of these compounds:

(a)

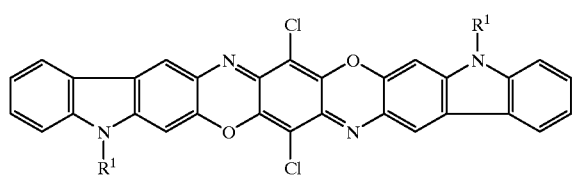

(b)

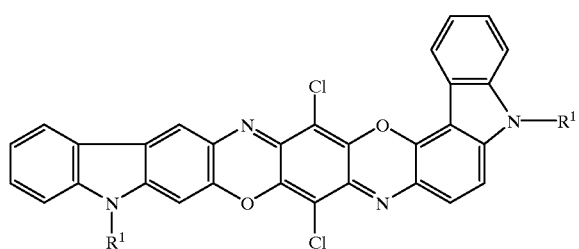

(c)

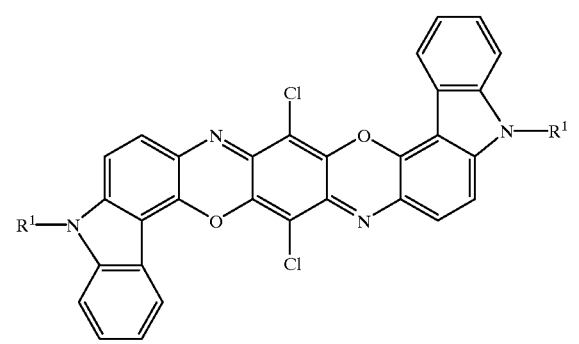

The aryl alkyl ether is judiciously used in an amount of from 3 to 20 times, preferably from 5 to 15 times, the amount by weight of the compound of the formula (II).

Examples of ring closure agents which can be used in the process of the invention are benzenesulfonyl chloride, 4-toluenesulfonyl chloride, nitro- or chloro-substituted benzenesulfonyl chloride, chloranil and pyridine N-oxide. A preferred ring closure agent is benzenesulfonyl chloride or 4-toluenesulfonyl chloride.

Benzenesulfonyl chloride, or substituted benzenesulfonyl chloride, is used preferably in amounts of from 0.5 to 2.0 mol, with particular preference from 1.0 to 1.5 mol, per mole of compound of the formula (II). Pyridine N-oxide is added preferably in an amount of from 1 to 3 mol, in particular from 1.2 to 2.5 mol, per mole of compound of the formula (II). Chloranil is added preferably in an amount of from 5 to 50 mol %, in particular from 10 to 40 mol %, based on the compound of the formula (II).

The reaction temperature is judiciously situated within the range from 140 to 200° C., preferably from 160 to 190° C. The reaction can be carried out under atmospheric pressure, superatmospheric pressure or reduced pressure. Reaction under atmospheric pressure is preferred. The reaction generally takes from 1 to 10 hours. Preference is given to a reaction time of from 3 to 7 hours.

In order to prepare the dioxazine compounds in highly pure form it is sufficient to filter the hot reaction mixture from the ring closure, said mixture containing an aryl alkyl ether of the invention, and to wash the filtercake with preferably hot aryl alkyl ether. The pure product is obtained in a readily filterable form and a high yield.

For example, at the end of the reaction, the reaction mixture can be diluted with aryl alkyl ether and filtered while hot, preferably at from 100 to 150° C. The resulting paste of crude product is washed with aryl alkyl ether, preferably hot, and then freed from the major amount of the adhering aryl alkyl ether by means, for example, of blowing with an inert gas. Residues of the aryl alkyl ether can be removed completely by means of steam distillation or drying. In order to remove the water-soluble byproducts, the product is generally also suspended in water, washed and dried.

The compounds of the formula (II) can also be prepared by condensing 3-amino-N-alkylcarbazoles of the formula (IV)

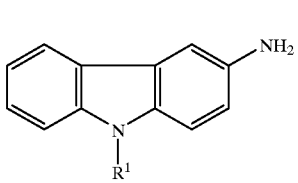

(IV)

in which $R^1$ is as defined above with chloranil in one or more of the aryl alkyl ethers of the invention and preferably in the presence of an acid-binding agent, such as sodium acetate, sodium hydrogencarbonate or sodium carbonate, for example. For the condensation with chloranil it is also possible to use a solution of the 3-amino-N-alkylcarbazole of the formula (IV) in the aryl alkyl ether, as obtained following reduction of the 3-nitro-N-alkylcarbazole in the aryl alkyl ether.

The compounds of the formula (II) obtained by this process can be reacted further in the form of the resulting suspension in the aryl alkyl ether, without isolation, to give the dioxazines.

The present invention therefore further provides a process for preparing dioxazines by condensing a 3-amino-N-alkylcarbazole of the formula (IV)

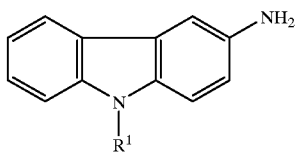

(IV)

in which R¹ is hydrogen or $C_1$–$C_8$ alkyl in an aryl alkyl ether of the formula (III) with chloranil to give the compound of the formula (II), followed by ring closure in the presence of a ring closure agent to give a dioxazine. The ring closure agent used can be any of those mentioned above. The condensation step can be conducted at temperatures from 20 to 90° C. The amount of chloranil is preferably from 0.6 to 0.9 mol per mole of 3-amino-N-alkylcarbazole used. Particular advantages are that there is no need to isolate the condensation product of the formula (II) and that all reaction steps can be carried out in the aryl alkyl ether of the invention.

The outstanding suitability of the aryl alkyl ethers for the synthesis of the dioxazine compounds was unforeseeable, since the aryl alkyl ethers are reactive compounds which are easily nitrated, for example, in the free o- or p-positions and/or are subject to ether cleavage in the presence of acids (cf., e.g., Beilstein, Volume 6, 3rd Supplement, p. 1385). It has surprisingly been found that under the nitration conditions, which result in a high yield of 3-nitro-N-alkylcarbazole, there is neither significant nitration of the aryl alkyl ether nor significant cleavage of the ether bond. Similarly, there is no significant ether cleavage of the aryl alkyl ethers of the invention in the course of the ring closure reaction brought about using acid-forming ring closure agents. In comparison with alkylbenzenes, alkylnaphthalenes, alkanes and alkenes, the aryl alkyl ethers of the invention possess good solvency for the starting materials, intermediates and byproducts of the synthesis, so that very good space-time yields are possible.

The examples which follow serve to illustrate the process of the invention.

EXAMPLES

Example 1

In a 0.5 liter four-necked flask with KPG glass paddle stirrer, dropping funnel, thermometer, distillation bridge and oil bath, 41.6 g of 2,5-dichloro-3,6-bis(9-ethyl-3-carbazolylamino)-1,4-benzoquinone are suspended in 300 g of 4-methylanisole. The suspension is heated to 165° C. and 18.3 g of benzenesulfonyl chloride are added dropwise over 15 minutes at 165° C. The mixture is subsequently heated to boiling temperature over 1 hour. It is subsequently stirred with distillation for 5 hours. About 100 ml are distilled off. The reaction mixture is cooled to 150° C. and filtered. The filtercake is washed with 250 g of hot 4-methylanisole at 150° C. and is dried in vacuo at 100° C. This gives 37.8 g of the dioxazine compound (91.6% of theory). The high purity of the product is evident from the elemental analysis, IR absorption spectrum, mass spectrum, X-ray diffractogram, and from the performance properties.

Examples 2 and 3

The procedure of Example 1 is repeated with the sole difference that 3-methylanisole and phenetole, respectively, are used instead of 4-methylanisole. The dioxazine compound is obtained with the following yields:

| Example | Reaction medium | Yield (% of theory) |
|---|---|---|
| 2 | 3-Methylanisole | 91.3 |
| 3 | Phenetole | 92.2 |

Comparative Example 1

The procedure of Example 1 is repeated with the sole difference that o-dichlorobenzene is used instead of 4-methylanisole. 34.8 g of the dioxazine compound are obtained (84.3% of theory).

Example 4

A 1 liter four-necked flask with stirrer, dropping funnel, thermometer, distillation bridge and oil bath is charged with 429.3 g of a 14.7% strength solution of 3-amino-9-ethylcarbazole in 4-methylanisole, which was obtained by reducing the corresponding nitro compound in 4-methylanisole, followed by stirred extraction, washing and separation of the organic phase. 50 g of 4-methylanisole are added. Following the metered addition of 40 g of chloranil and 16 g of sodium carbonate, the mixture is stirred at from 30 to 65° C. until 3-amino-9-ethylcarbazole can no longer be seen in the TLC. 200 g of 4-methylanisole are added, the water of reaction is distilled off with heating at 165° C., 37 g of benzenesulfonyl chloride are added dropwise over 15 minutes at 165° C., and the reaction mixture is heated to boiling temperature over 1 hour. Subsequent stirring takes place for 4 hours with distillation. About 200 ml are distilled off. Thereafter, the contents of the flask are cooled to 150° C. and filtered. The rate of filtration is very high. The filtercake is washed with 500 g of hot 4-methylanisole at 150° C., blown dry and extracted by stirring in water. Following the distillative removal of the 4-methylanisole using steam, the product is filtered, washed with water and dried. This gives 79.7 g of the dioxazine compound (90.1% of theory). The high purity of the product is evident from the elemental analysis, IR absorption spectrum, mass spectrum, X-ray diffractogram and from the performance properties.

Comparative Example 2

The procedure of Example 4 is repeated with the sole difference that o-dichlorobenzene is used instead of 4-methylanisole. 74.0 g of the dioxazine compound are obtained (83.7% of theory).

Use Example 1

A plastic container filled to 90% of its volume with 1400 parts of cylindrical grinding media (Cylpebs®, diameter 12 mm, manufacturer: Groh GmbH, Hof) is charged in succession with 22.5 parts of the dioxazine compound, prepared in accordance with one of the above examples, and 7.5 parts of anhydrous sodium sulfate. The mixture is finely ground for 4 hours with shaking on a vibratory mill (model Vibratom; manufacturer: Siebtechnik Mühlheim). The ground product is then removed from the grinding media by sieving. 25.9 parts of ground product are obtained. 37.5 parts of isobutanol (85%) are placed in a stirring vessel, and 2.5 parts of 98% strength formic acid and 0.38 part of the sodium salt of an alkylphenol polyglycol ether sulfate are added in succession. Then 25 parts of the above ground product are introduced and the mixture is stirred at 20–25° C. for 20 hours. During this time, a further 50 parts of 85% isobutanol are added. Subsequently, 150 parts of water are added, the mixture is heated at boiling for 5 hours, and the isobutanol is distilled off azeotropically by heating to 100° C. at the bridge. After the mixture has cooled to 60° C., the pigment is filtered off with suction, washed with water until neutral and salt-free, and dried at 80° C.

This gives 18.6 parts of pigment which in the alkyd-melamine resin varnish gives transparent and strongly colored violet finishes with a red shade and with high purity. The fastness to overcoating is excellent. In nitrocellulose gravure printing, transparent and strongly colored prints with a high purity are obtained.

Use Example 2

A plastic container filled to 90% of its volume with 1400 parts of cylindrical grinding media (Cylpebs®, diameter 12 mm, manufacturer: Groh GmbH, Hof) is charged with 30 parts of the dioxazine compound, prepared in accordance with one of the above examples. The crude pigment is finely ground for 4 hours with shaking on a vibratory mill (model Vibratom; manufacturer: Siebtechnik Mühlheim). The ground product is then removed from the grinding media by sieving. 25.9 parts of ground product are obtained. 37.5 parts of isobutanol (85%) are placed in a stirring vessel, and 1.25 parts of 98% strength formic acid are added. Then 25 parts of the above ground product are introduced and the mixture is stirred at 20–25° C. for 20 hours. During this time, a further 50 parts of 85% isobutanol are added. Subsequently, 150 parts of water are added, and the isobutanol is distilled off azeotropically by heating to 100° C. at the bridge. After the mixture has cooled to 60° C., the pigment is filtered off with suction, washed with water until neutral, and dried at 80° C.

This gives 24.2 parts of pigment which in PVC gives transparent and strongly colored violet colorations. The fastness to bleeding is very good.

What is claimed is:

1. A process for preparing dioxazines by ring closure of a compound of the formula

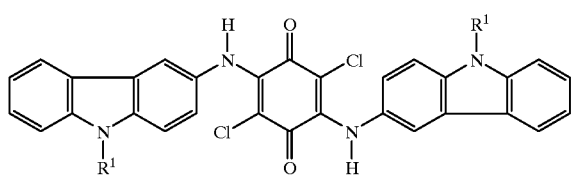

(II)

in which $R^1$ is hydrogen or straight-chain or branched $C_1$–$C_4$ alkyl in the presence of a ring closure agent, which comprises using as reaction medium an aryl alkyl ether of the formula (III) or a mixture of aryl alkyl ethers of the formula (III)

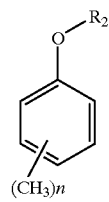

(III)

in which n is an integer from 0 to 2 and $R_2$ is ethyl if n is 0 or is methyl if n is 1 or 2.

2. A process for preparing dioxazines by condensing a 3-amino-N-alkylcarbazole of the formula (IV)

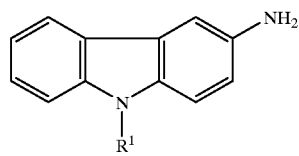

(IV)

in which $R^1$ is hydrogen or straight-chain or branched $C_1$–$C_4$ alkyl with chloranil in the presence of an acid-binding agent to give a condensation product of the formula (II) followed by ring closure to dioxazine, which comprises conducting the condensation and the ring closure in an aryl ether of the formula (III) or in a mixture of aryl alkyl ethers of the formula (III)

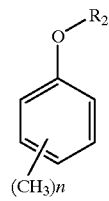

(III)

in which n is an integer from 0 to 2 and $R_2$ is ethyl if n is 0 or is methyl if n is 1 or 2.

3. The process as claimed in claim 1, wherein $R^1$ is methyl, ethyl or propyl.

4. The process as claimed in claim 2, wherein $R^1$ is methyl, ethyl or propyl.

5. The process as claimed in claim 2, wherein the compound of the formula (II) is not isolated.

6. The process as claimed in claim 1, wherein the aryl alkyl ether of the formula (III) is phenetole, 3-methylanisole or 4-methylanisole.

7. The process as claimed in claim 2, wherein the aryl alkyl ether of the formula (III) is phenetole, 3-methylanisole or 4-methylanisole.

8. The process as claimed in claim 1, wherein the aryl alkyl ether(s) of the formula (III) is or are used in from 3 to 20 times the amount by weight of the compound of the formula (II).

9. The process as claimed in claim 2, wherein the aryl alkyl ether(s) of the formula (III) is or are used in from 3 to 20 times the amount by weight of the compound of the formula (II).

10. The process as claimed in claim 1, wherein the ring closure is conducted at a temperature from 140 to 200° C.

11. The process as claimed in claim 2, wherein the ring closure is conducted at a temperature from 140 to 200° C.

12. The process as claimed in claim 1, wherein the ring closure agent is benzenesulfonyl chloride, 4-toluenesulfonyl chloride, nitro- or chloro-substituted benzenesulfonyl chloride, chloranil or pyridine N-oxide.

13. The process as claimed in claim 2, wherein the ring closure agent is benzenesulfonyl chloride, 4-toluenesulfonyl chloride, nitro- or chloro-substituted benzenesulfonyl chloride, chloranil or pyridine N-oxide.

14. The process as claimed in claim 1, wherein after the end of ring closure the reaction mixture is filtered at a temperature from 100 to 150° C.

15. The process as claimed in claim 2, wherein after the end of ring closure the reaction mixture is filtered at a temperature from 100 to 150° C.

16. The process as claimed in claim 14, wherein the filtercake obtained is washed with an aryl alkyl ether of the formula (III).

17. The process as claimed in claim 15, wherein the filtercake obtained is washed with an aryl alkyl ether of the formula (III).

* * * * *